United States Patent [19]

Suzuki

[11] Patent Number: 5,457,645
[45] Date of Patent: Oct. 10, 1995

[54] PATTERN RECOGNITION SYSTEM INCLUDING A CIRCUIT FOR DETECTING MAXIMUM OR MINIMUM DATA ELEMENTS WHICH DETERMINES THE STANDARD PATTERN CLOSEST TO THE INPUT PATTERN

[75] Inventor: Takao Suzuki, Itami, Japan

[73] Assignee: Matsushita Electric Industrial Co., Ltd., Osaka, Japan

[21] Appl. No.: 11,111

[22] Filed: Jan. 29, 1993

Related U.S. Application Data

[63] Continuation-in-part of Ser. No. 616,873, Nov. 21, 1990, abandoned.

[30] Foreign Application Priority Data

Nov. 24, 1989 [JP] Japan ................................. 1-305406
Sep. 25, 1990 [JP] Japan ................................. 2-255824

[51] Int. Cl.⁶ .............................. G06F 7/02; G06F 17/16
[52] U.S. Cl. .......................... 364/728.03; 364/715.06; 364/259.9; 364/261.5; 364/262.1; 364/DIG. 1; 364/937.8; 364/938.1; 364/940.2; 364/947.2; 364/DIG. 2; 395/800
[58] Field of Search ...................... 395/425, 2.3, 2.47, 395/500; 364/715.06, 728.03, 259.9, 261.5, 262.1, 937.8, 938.1, 940.2, 947.2; 380/36

[56] References Cited

U.S. PATENT DOCUMENTS 3,713,107  1/1973  Barsamian ............................... 395/800
3,902,160  9/1975  Kawa ......................................... 382/36
3,931,612  1/1976  Stevens et al. ........................... 395/600
4,774,688  9/1988  Kobayashi et al. ...................... 395/375
4,967,349 10/1990  Kodama et al. ......................... 395/800
4,991,134  2/1991  Ivsin ......................................... 395/800
5,051,939  9/1991  Nakamura .......................... 364/715.06
5,072,418 12/1991  Boutaud et al. .................... 364/715.06
5,191,635  3/1993  Fujimoto ..................................... 395/2
5,309,547  5/1994  Niyada et al. ............................ 395/2.5

OTHER PUBLICATIONS

Z8000 *CPU User's Reference Manual*, ZRLOG, Prentice Hall, pp. 11–12, 1982.
Bentley, Programming Pearls, Addelson–Wesley, p. 46, 1986.
Gopalan et al, "Speech Pattern Generation and Recognition Using a Personal Computer".
Lorin, H., *Sorting and Sort Sytems*, Addison–Wesley Publishing Company, Inc., pp. 6–13 (1975).

*Primary Examiner*—Thomas G. Black
*Assistant Examiner*—Jack M. Choules
*Attorney, Agent, or Firm*—Ratner & Prestia

[57] ABSTRACT

A pattern recognition system that compares input data signals to standard pattern data signals by calculating the distance between the input data and the standard pattern data then uses a maximum/minimum data detection system to choose the standard pattern which is closest to the input data. The maximum/minimum data detecting system includes two selectors are used to update tentative maximum/minimum data elements and associated address (separately stored in two registers). The selectors are controlled by the result of a comparison between the tentative data and newly-fetched data according to a predetermined rule.

7 Claims, 13 Drawing Sheets

$P_{11} \sim P_{14}$
$P_{21} \sim P_{24}$ } Standard Patterns
$P_{31} \sim P_{34}$
$P_{41} \sim P_{44}$ D  Input Data $d_{11} \sim d_{14}$
$d_{21} \sim d_{24}$ } Distances
$d_{31} \sim d_{34}$
$d_{41} \sim d_{44}$

FIG. 12
PRIOR ART $P_{11} \sim P_{14}$
$P_{21} \sim P_{24}$
$P_{31} \sim P_{34}$
$P_{41} \sim P_{44}$
} Standard Patterns D    Input Data $d_{11} \sim d_{14}$
$d_{21} \sim d_{24}$
$d_{31} \sim d_{34}$
$d_{41} \sim d_{44}$
} Distances

5,457,645

PATTERN RECOGNITION SYSTEM INCLUDING A CIRCUIT FOR DETECTING MAXIMUM OR MINIMUM DATA ELEMENTS WHICH DETERMINES THE STANDARD PATTERN CLOSEST TO THE INPUT PATTERN

This is a continuation-in-part of application Ser. No. 07/616,873 filed Nov. 21, 1990 and now abandoned.

BACKGROUND OF THE INVENTION

The present invention relates to a maximum/minimum data detecting system to detect the maximum or the minimum data in a given set of data.

In FIG. 8 is shown a block diagram of a conventional maximum/minimum data detecting system. The system has an array of RAM (Random Access Memory) 801, two bus lines 802,803, an ALU (Arithmetic and Logic Unit) 804, two registers 807,808, and an address pointer 809.

In FIG. 12 is shown a program for determining the maximum data in a data set. The program is designed to run on the conventional system of FIG. 8.

For illustration purposes assume that 50 data elements are stored in consecutive addresses within RAM 801. The first instruction, listed in the first line of the program in FIG. 12, points the address pointer 809 to the data element in address location "1" (AY=1). The second instruction transfers the data at address location "1" through the bus line 803, into register 808. This data is a tentative maximum X. The third instruction points the address pointer to the data in address location "2" in order to fetch the next data in RAM 801. The data at address location "2" is stored in register 807 through bus line 802. The following instruction, X-Y(AY) orders ALU 804 to carry out subtraction of the two data elements stored in registers 807,808. This calculation provides the result Z. The fifth instruction is a conditional-branch which is controlled by the result Z. If Z is negative, the sixth instruction is executed. This instruction transfers the data from register 807 to register 808, resulting in the replacement of the tentative maximum X by previously fetched data Y(AY).

On the other hand, if the result Z turns out to be zero or positive, the seventh instruction is executed. In the seventh instruction, the address pointer AY is incremented by one.

The eighth instruction determines if address pointer AY has reached location 50. If it has not, then some of the data in RAM 801 remains unchecked. Thus, the instructions from the fourth line through the eighth line will be executed again. In this manner, the instructions from the fourth line through the eighth line will be repeated 49 times before the program checks all of the 50 data elements. If the eighth instruction finds address pointer AY larger than 50, then all of the data in RAM has been checked. In this case, this instruction ends the program. The maximum data may then be found in register 808.

The minimum data can be detected merely by reversing the order of the subtrahend and the minuend in the fourth instruction. However, this type of maximum/minimum data detecting system as described above has certain disadvantages, some of which are as follows:

(1) To evaluate the comparison within a conditional branch and to switch the flow of the program according to the result, some time-consuming steps are necessary. This retards system operation.

(2) Because of an inability to store address pointers as the program is executing, the system cannot provide any address information relating to detected maximum or minimum data.

SUMMARY OF THE INVENTION

The present invention has as its principal object the provision of an improved maximum/minimum data detecting system that offers addresses of the detected data as well as numerical information.

Another object of the invention is to provide a fast maximum/minimum data detecting system that runs with a simplified program, compared with the prior art.

These objects are accomplished according to the present invention by an improved maximum/minimum data detecting system, hereinafter referred to as a data detecting system comprising a means for reading one data element after another from a set of data elements, a first storage means in which the first date element of the set of data elements is initially stored, and second storage means in which the second or latter data elements of the set of data elements are successively stored. In addition, the invention comprises a means for comparing two data elements stored in the first and the second storage means, and a control means, controlled by the result of the comparison, which reloads the content of the first store means according to a predetermined rule.

In another configuration of the present invention, a data detecting system is disclosed, comprising a means for reading out one data element after another from a set of data elements, a first storage means in which the first data element of the set of data elements is initially stored, a second storage means in which the second or the latter data elements of the set of elements are successively stored, and a third storage means in which the address of the first data element of the set of data elements is initially stored. In addition, the invention comprises a means for comparing data elements which are stored in the first and the second storage means, a first control means controlled by the result of the comparison, which reloads the content of the first storage means according to a predetermined rule, and a second control means, controlled by the result of the comparison, which reloads the content of the third storage means according to a predetermined rule.

BRIEF DESCRIPTION OF THE FIGURES

FIG. 10 Shows another exemplary program to run a data detecting system of the present invention.

FIG. 11 provides still another exemplary program to run a data detecting system of the present invention.

FIG. 12 provides a program to run on a conventional data detecting system shown in FIG. 8.

DESCRIPTION OF THE PREFERRED EMBODIMENTS

Figure 1:
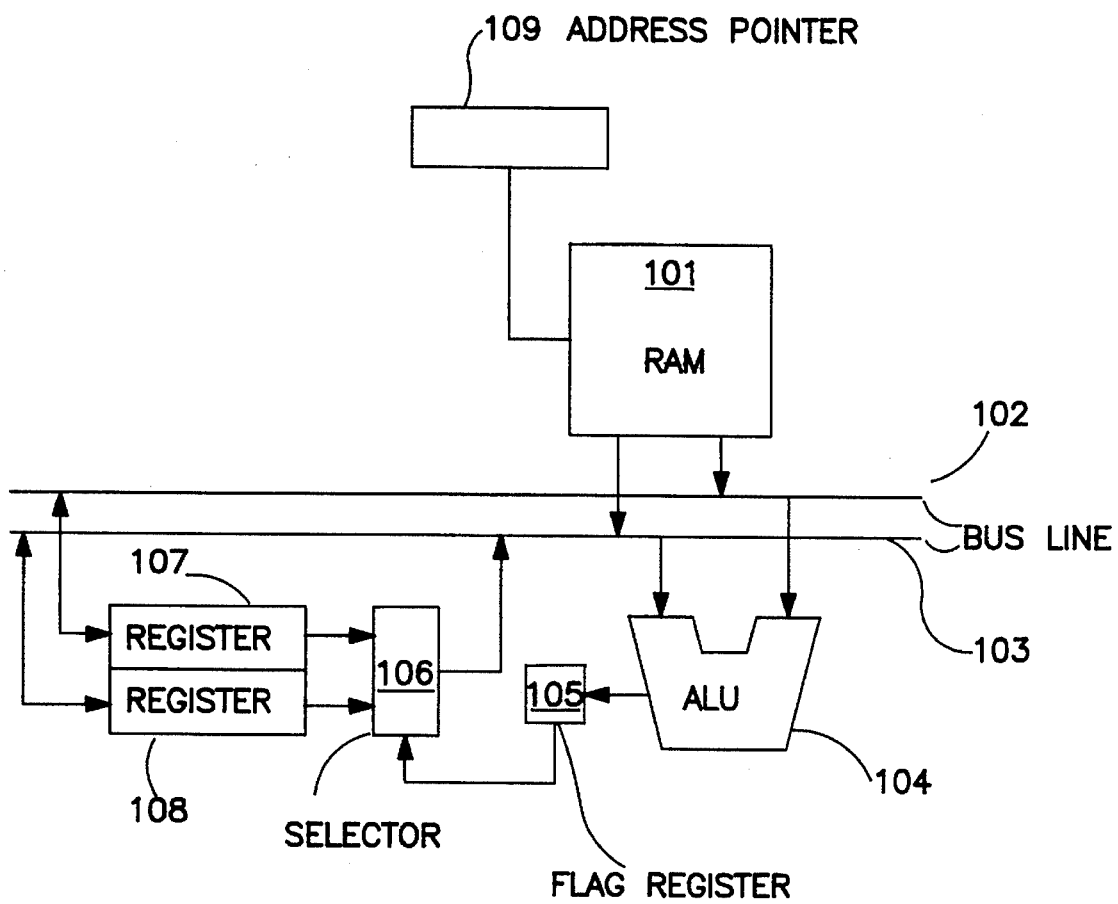
FIG. 1 is a block diagram of a first exemplary embodiment of a data detecting system in accordance with the present invention.

FIG. 1 is a block diagram of a first exemplary embodiment of a data detecting system in accordance with the present invention.

A data detecting system of this configuration has an array of RAM 101, two bus lines 102,103, an ALU 104, a flag register 105, a selector 106 controlled by the state of the flag register 105, two registers 107,108 and an address pointer 109.

Figure 9:
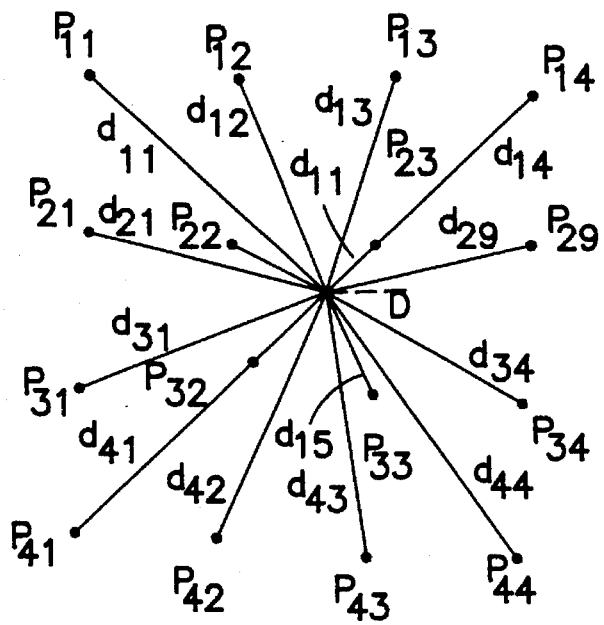
FIG. 9 shows an exemplary program to run a data detecting system of the present invention.

The program shown in FIG. 9 is for searching the maximum data when used in conjunction with the data detecting system of FIG. 1.

Assume that 50 data elements (e.g. corresponding signals) are stored in consecutive addresses within RAM 101. The first instruction listed in the first line of the program in FIG. 9, points the address pointer 109 to the data element in address location "1" (AY=1). The second instruction transfers the data at address location "1" through bus line 103 into register 108. This data is a tentative maximum X.

The third instruction points the address pointer to the data in address location "2" in order to fetch the next data in RAM 101. The data at address location "2" is stored through bus line 102 in register 107. The following instruction, X-Y(AY) has ALU 104 carry out subtraction of the two data elements stored in registers 107, 108. This calculation provides the result Z. The result Z sets the state of the flag of flag register 105. The state of the flag controls selector 106. The fifth instruction replaces the contents of register 108 with W. W is selected from the two data elements, X and Y(AY), stored in registers 107,108 respectively. The two data elements are read out simultaneously. Then, one of them is selected by selector 106. The data selection is carried out in the following manner.

If the state of the flag shows that the result Z is negative, indicating that the data element Y(AY) stored in register 107 is larger than the data element X stored in register 108, then selector 106 selects register 107 to pass the data Y(AY) through bus line 103 to register 108, resulting in the replacement of the tentative maximum data X by the last-fetched data Y(AY).

On the other hand, if the result Z turns out to be zero or positive, indicating that the data Y(AY) stored in register 107 is equal to or smaller than the data X stored in register 108, selector 106 selects register 108 to pass the data element X through the bus line 103 to register 108. In this case, the data element in register 108 remains unchanged. The data selection step described above is carried out on a "hardware" basis by selector 106 according to a predetermined rule. Therefore, this operation is performed without the burden of conditional-branch commands that retard the operation of conventional data detecting systems.

In the sixth instruction, the address data AY is incremented by one.

The seventh instruction determines if the address data AY reaches 50. If address AY is 50 or less, then some of the data elements in RAM 101 remain unchecked. Then, in that case, the instructions from the fourth line through seventh line are executed again. In this manner, the instructions from the fourth line through seventh line are repeated 49 times before the program checks all 50 data elements.

If the seventh instruction finds the address data AY larger than 50, that means all the data in RAM 101 have been checked. So, in this case, this instruction ends the program. The maximum data is found in register 108 after the above-mentioned operation.

The minimum data can also be detected merely by reversing the order of the subtrahend and the minuend in the fourth instruction.

Figure 2:
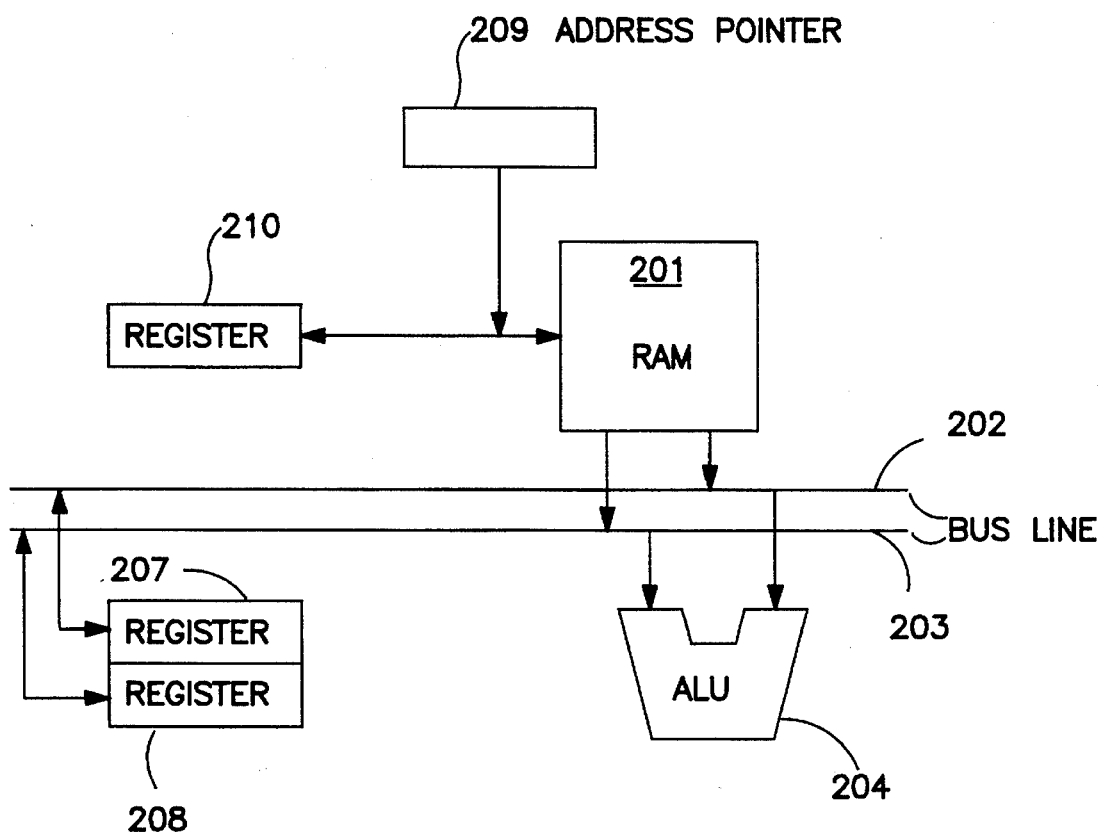
FIG. 2 is a block diagram of a second exemplary embodiment of a data detecting system of the present invention.

FIG. 2 shows a block diagram of a second exemplary embodiment of a data detecting system of the present invention. The system has an array of RAM 201, two bus lines 202,203, an ALU 204, three registers 207,208,210, and an address pointer 209.

Figure 10:
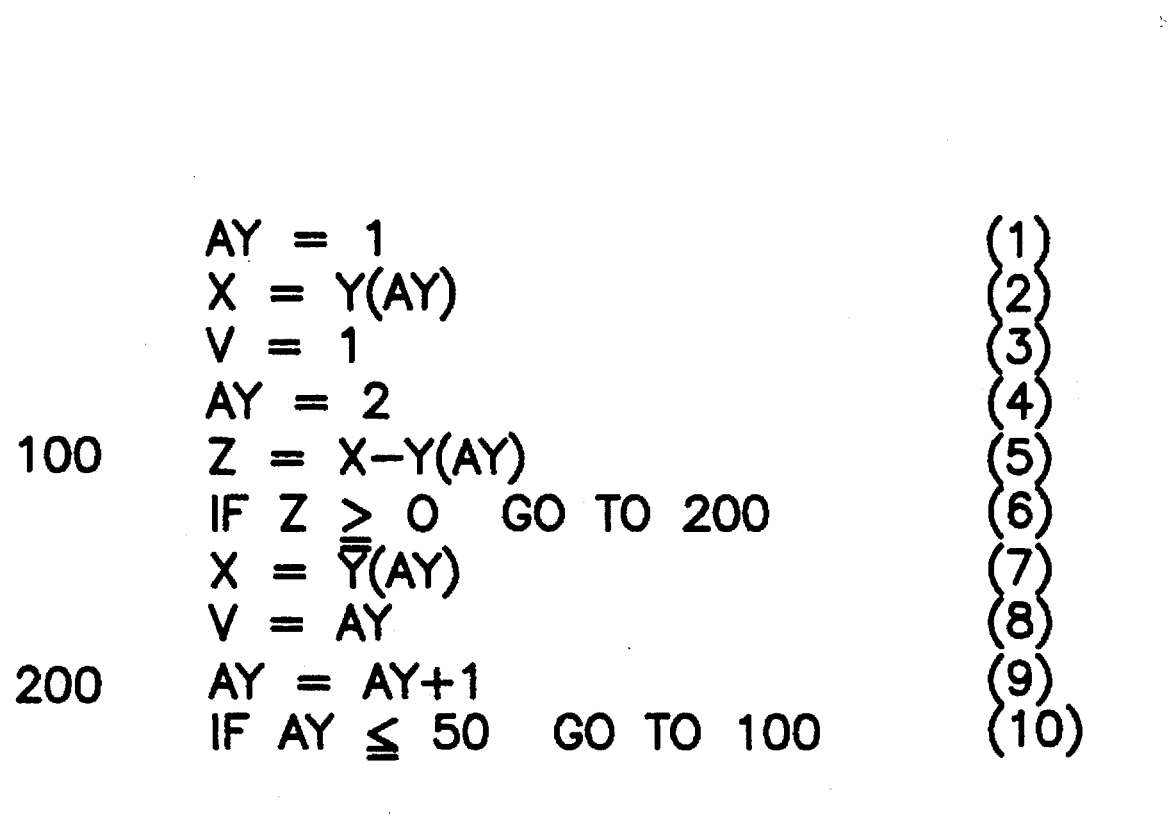

The program shown in FIG. 10 is for searching the maximum data when used in conjunction with the data detecting system illustrated in FIG. 2. Assume that 50 data elements are stored in consecutive addresses within RAM 201.

The first instruction in FIG. 10 points the address pointer 209 to the data element in address location "1" (AY=1).

The second instruction transfers the data at address location "1" through the bus line 201, into register 208. This data location is a tentative maximum X.

In the third instruction, the address of the first data element, at address location "1" is stored in register 210 as V. V is an address of a tentative maximum data element X.

The fourth instruction points the address pointer to the data in address location "2" to fetch the next data in RAM 201. The data at address location "2" is stored in register 207 through bus line 202.

The following instruction, X-Y(AY), orders the ALU to carry out subtraction of the data elements stored in registers 207,208. This calculation provides the result Z.

The sixth instruction is a conditional-branch command based upon result Z. If Z is negative, the seventh instruction is executed. This instruction transfers the data from register 207 to register 208, resulting in the replacement of the tentative maximum X by the last-fetched data Y(AY). The eighth instruction updates address V by transferring the last-fetched address (AY=2) to register 210, thus replacing the previous V.

On the other hand, if the result Z turns out to be zero or positive, the ninth instruction follows the sixth instruction. Thus, the seventh and eighth instructions are skipped.

In the ninth instruction, address AY is incremented by one. The tenth instruction determines if the address AY reaches 50. If the address AY is 50 or less, this indicates some of the data in RAM 201 remains unchecked. Thus, the instructions from the fourth line through the eighth line are executed again. In this manner, the instructions from the fifth line through the tenth line will be repeated 49 times before the program checks all 50 data elements.

If the tenth instruction finds address AY larger than 50, this indicates that all the data in RAM 201 has been checked. In this case, this instruction ends the program. After the above-mentioned operation, the maximum data element is found in register 208 and the address of the maximum data element is found in register 210.

The minimum data element and the address thereof can also be detected merely by reversing the order of the subtrahend and the minuend in the fifth instruction.

Figure 3:
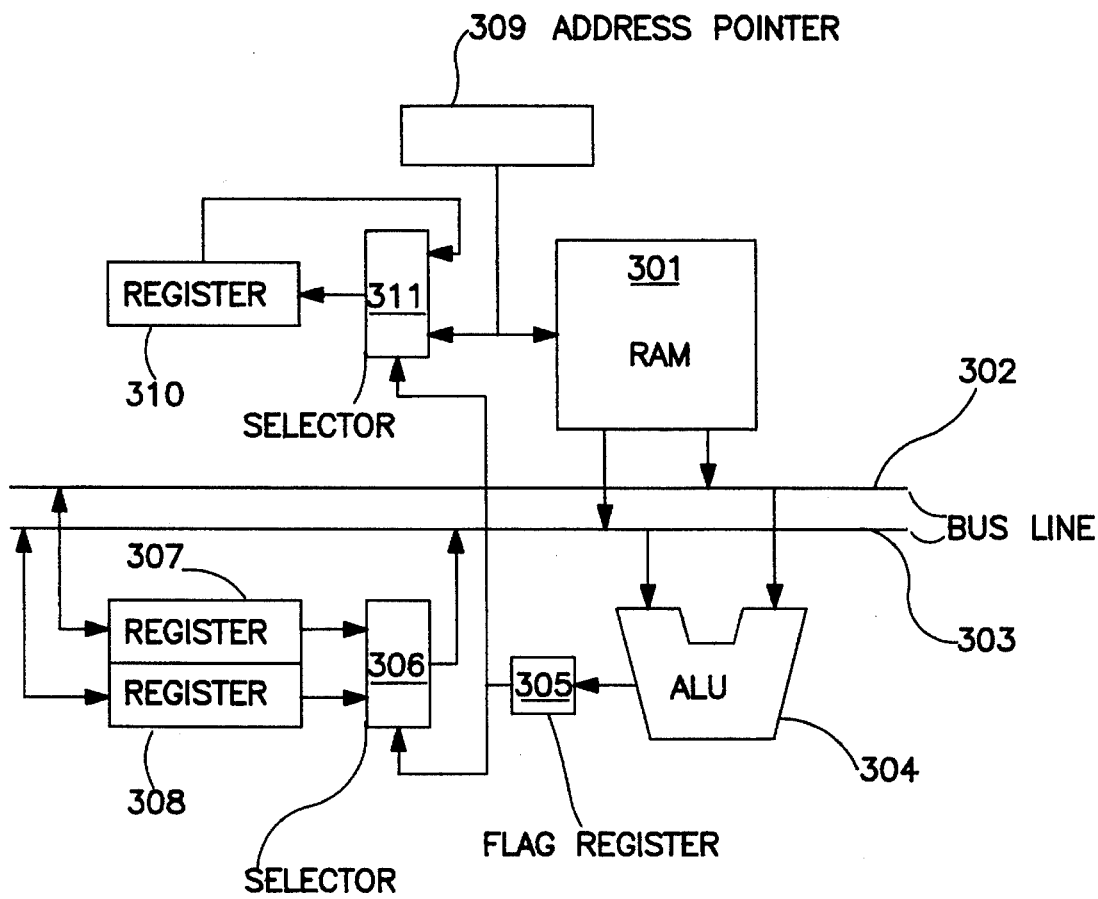
FIG. 3 is a block diagram of a third exemplary embodiment of a data detecting system of the present invention.

FIG. 3 is a block diagram of the third exemplary embodiment of a data detecting system of the present invention.

A data detecting system of this configuration has an array of RAM 301, two bus lines 302,303, an ALU 304, three registers 307,308,310, an address pointer 309, a flag register 305, and two selectors 306,311.

Figures 11, 12:
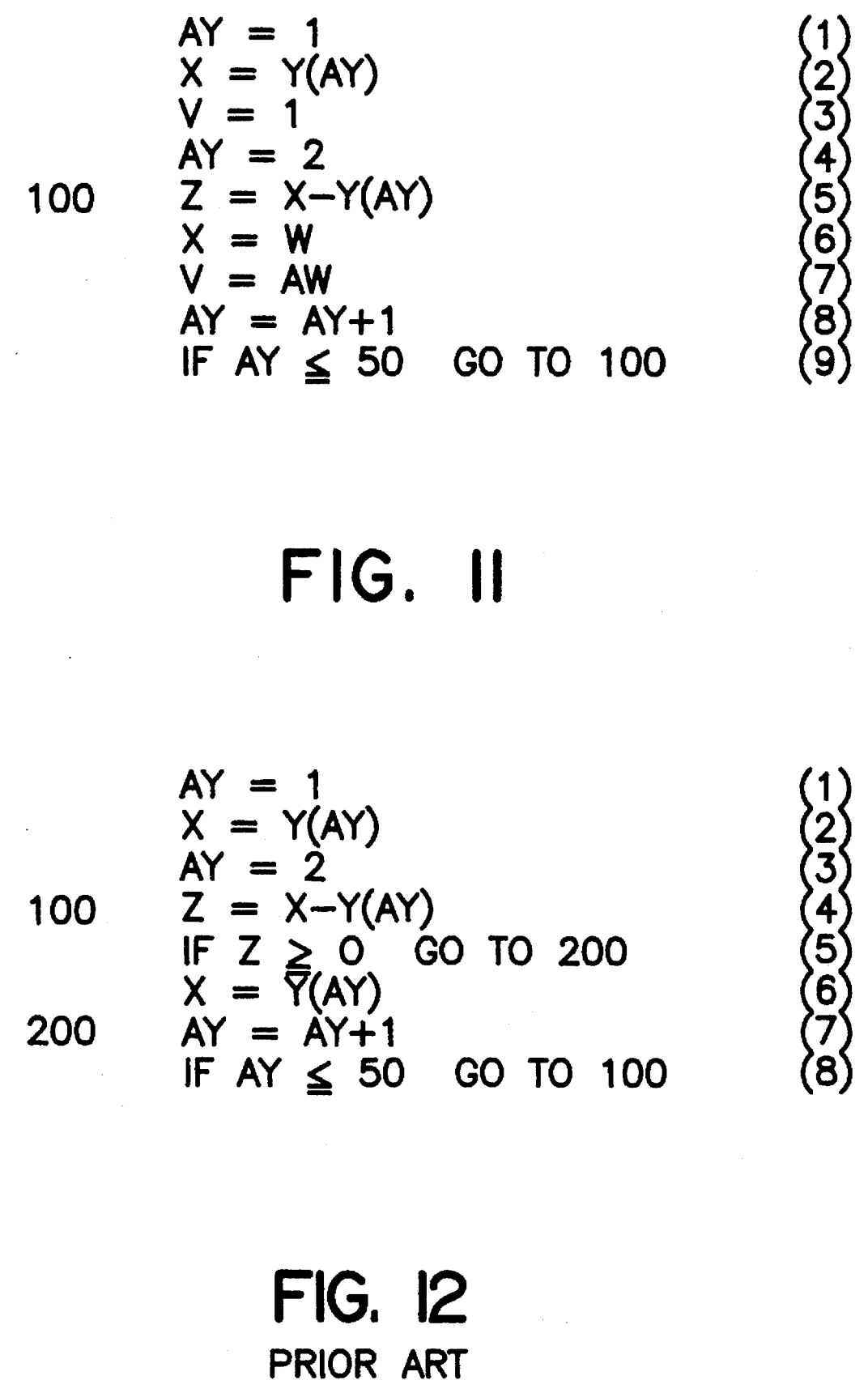

The program shown in FIG. 11 is for searching the maximum data by running the data detecting system illustrated in FIG. 3. Again, assume that 50 data element are stored in consecutive addresses within RAM 301.

The first instruction in FIG. 11 points the address pointer 309 to the data in address location "1" (AY=1).

The second instruction transfers the data at address location "1", through bus line 303, into register 308. This data is a tentative maximum X.

In the third instruction, the address of the first data element ("1"), is stored in register 310 as V. V is an address of a tentative maximum data element.

The fourth instruction points the address pointer to the data in address location "2" to fetch the next data element. In RAM 301, the data element at address "2" is stored in register (AY) 307 through bus line 302.

The fifth instruction, X-Y(AY), has ALU 304 carry out subtraction of the two data elements stored in registers 307,308. This calculation provides the result Z. The result Z sets the state of the flag of the flag register 305. The state of the flag controls selectors 306,311.

The sixth and seventh instructions replace the contents of register 308 and register 310 respectively. W is selected from the two data elements, X and Y(AY) stored in registers 307,308, respectively. The two data elements are read out simultaneously. Then, one of the data elements is selected by selector 306. WA is the selected address from the two data elements, V and AY. The two data elements are given to selector 311. Then one of the data elements is selected by selector 311.

Data selection is carried out in the following manner. If the state of the flag shows that the result Z is negative, indicating that the data element Y(AY), stored in register 307, is larger than the data element X, stored in register 308, selector 306 selects register 307 to transfer data element Y(AY) through bus line 303, to register 308, thus resulting in the replacement of the tentative maximum data element X by the last-fetched data element Y(AY). Selector 311 selects the address of last-fetched data element AY to replace the contents of register 310. On the other hand, if the result Z is zero or positive, meaning that the data Y(AY) stored in register 307 is equal to or smaller than data element X stored in register 308, selector 306 selects register 308 to transfer data element X, through bus line 303, to register 308. Likewise, selector 311 again selects register 310 and puts the tentative address V into register 310. In this case, the data in registers 308,310 remains unchanged. The data selection steps described above are carried out on a "hardware" basis by selectors 306,311 according to a predetermined rule. Therefore, this operation is performed without burden of conditional-branch commands that retard the operation of conventional data detecting systems.

In the eighth instruction, address AU, given by address pointer 309, is incremented by one.

The ninth instruction determines if address AY reaches 50. If the address AY is 50 or less, then some of the data elements in RAM 301 remain unchecked. In that case, the instruction from the fifth line through ninth line are executed again. In this manner, the instructions from the fifth line through the ninth line are repeated 49 times before the program checks all of 50 data elements.

If the ninth instruction finds address AY larger than 50, all the data elements in RAM 301 have been checked. In this case, this instruction ends the program. After the abovementioned operation, the maximum data element is found in register 308 and the address of-the maximum data element is found in register 310.

The minimum data element can also be detected merely by reversing the order of the subtrahend and the minuend in the fifth instruction.

Figure 4:
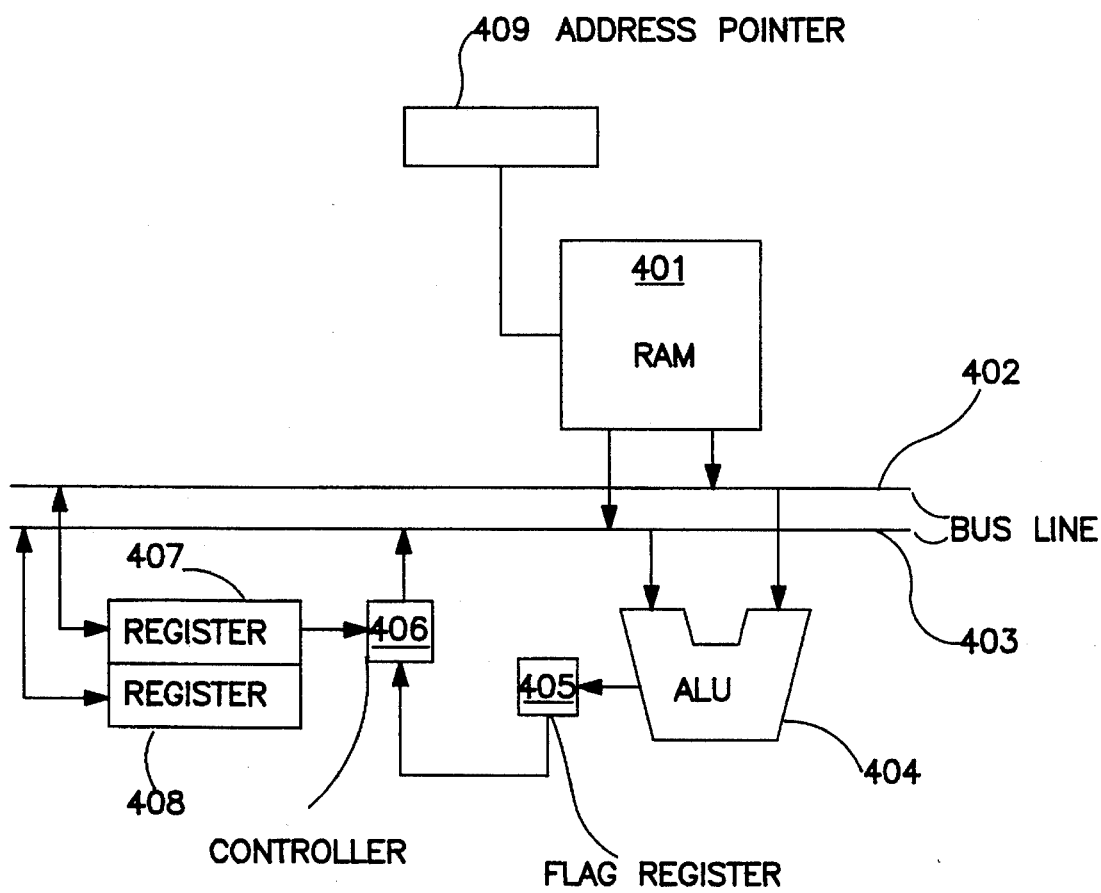
FIG. 4 is a block diagram of a fourth exemplary embodiment of a data detecting system of the present invention.

FIG. 4 illustrates a block diagram of the fourth exemplary embodiment of the present invention. This data detecting system comprises an array of RAM 401, two bus lines 402,403, an ALU 404, a flag register 405, a controller 406 controlled by the state of the flag register 405, two registers 407,408, and an address pointer 409. The configuration of the embodiment of FIG. 4 is identical to that of FIG. 1 except that the system of FIG. 1 has a controller as a part of the control means for the replacement of the contents of one of the registers. An exemplary program for searching for the maximum data element within the system of FIG. 4 is shown in FIG. 9.

The exemplary embodiment of FIG. 4 works in the same way as described in the first embodiment except for the step in which the tentative maximum data element X is replaced (responding to the fifth instruction).

If the state of the flag shows that the result Z is negative, indicating that the data element Y(AY) stored in register 407 is larger than the data element X stored in the register 408, the controller 406 allows data element Y(AY) to be transferred to register 408, resulting in the replacement of the tentative maximum data element X by the last-fetched data element Y(AY).

On the other hand, if the result Z turns out to be zero or positive, indicating that data element Y(AY) stored in register 407 is equal to or smaller than the data element X stored in register 408, the controller 406 is not activated. Since no data replacement occurs, the content of register 408 remains unchanged. The control step described above is carried out on a "hardware" basis by controller 406 according to a predetermined rule.

Therefore, this operation is free from time-consuming conditional-branch commands that retard the operation of a conventional data detecting system.

Figure 5:
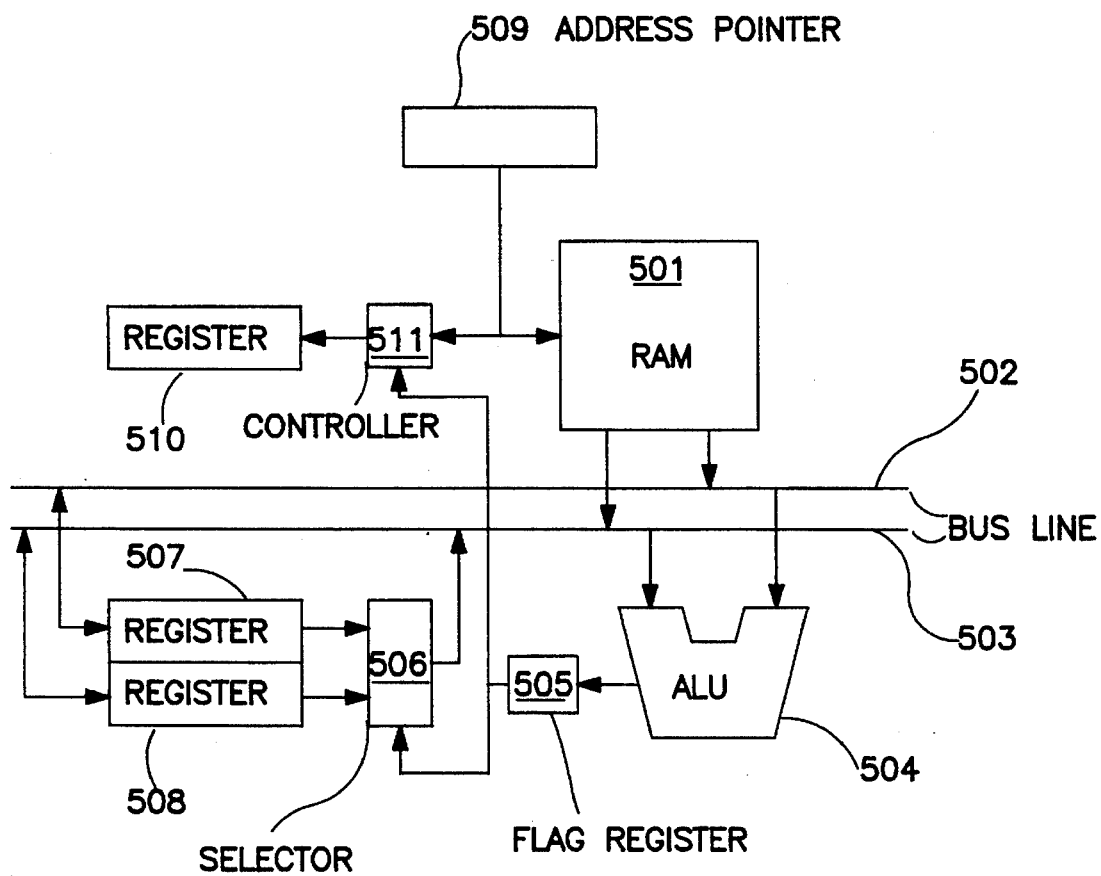
FIG. 5 is a block diagram of a fifth exemplary embodiment of a data detecting system of the present invention.

FIG. 5 is a block diagram of a fifth exemplary embodiment of the present invention. This data detecting system comprises an array of RAM 501, two bus lines 502,503, an ALU 504, a flag register 505, a selector 506 and a controller 511 controlled by the state of flag register 505, three registers 507,508,510, and an address pointer 509. The configuration of the embodiment of FIG. 5 is identical to that of FIG. 3 except that the former has a controller as part of the control means for the replacement of the content of the address register. One exemplary program for searching for a maximum data element, using the system of FIG. 5, is shown in FIG. 11.

The exemplary embodiment of FIG. 5 works in the same way as described in the third exemplary embodiment except for the step in which the data element V, the address of the tentative maximum data element X, is replaced responding to the seventh instruction.

If the state of the flag shows that result Z is negative, meaning that data element Y(AY), stored in register 507, is larger than data element X stored in register 508, then controller 511 passes the address of last-fetched data element AY to register 510 in order to replace tentative address V.

On the other hand, if the result Z turns out to be zero or positive, which means the data element Y(AY) stored in register 507 is equal to or smaller than the data X stored in register 508, controller 511 is not activated. Thus no data replacement occurs and the content of register 510 remains unchanged. The control step described above is carried out on a "hardware" basis by controller 511 according to a predetermined rule.

Therefore, this operation is free from time-consuming conditional-branch commands that retard the operation of the conventional data detecting system.

Figure 6:
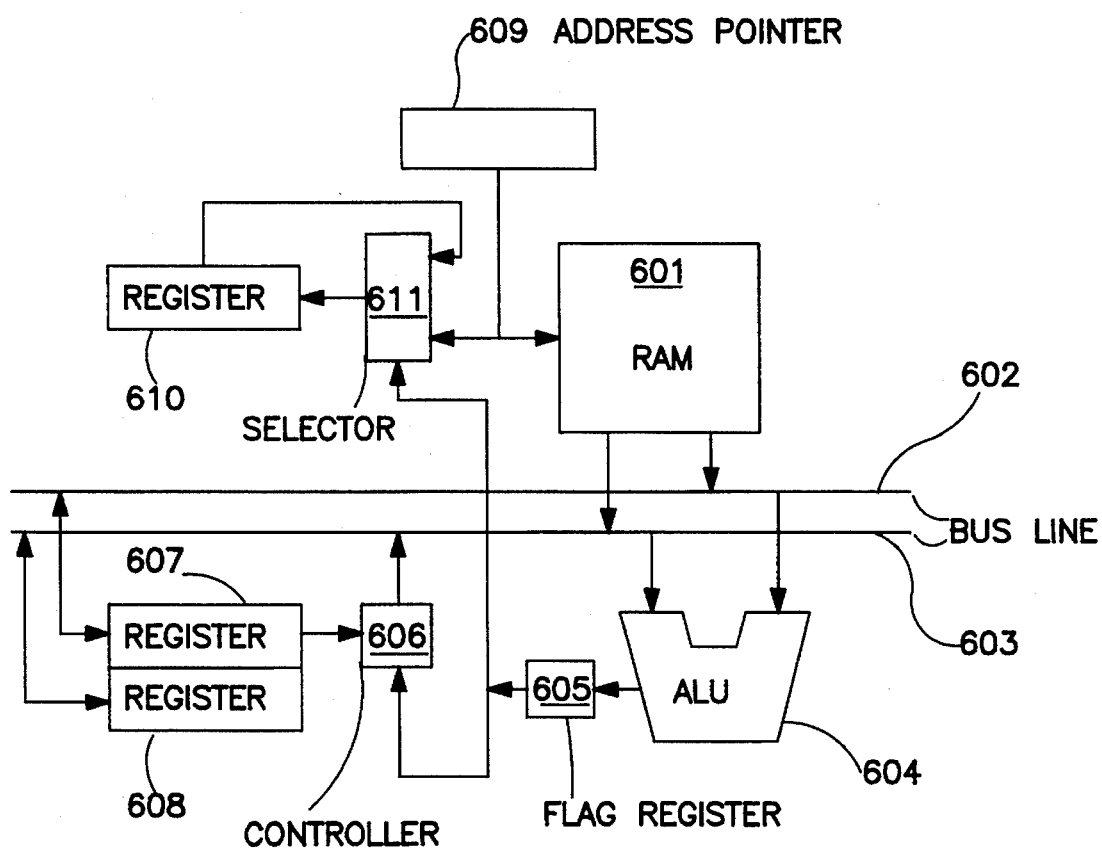
FIG. 6 is a block diagram of a sixth exemplary embodiment of a data detecting system of the present invention.

FIG. 6 is a block diagram of the sixth exemplary embodiment of the present invention. This data detecting system has an array of RAM 601, two bus lines 602,603, an ALU 604, a register 605, a controller 606 and a selector 611 both of which are controlled by the state of flag register 605, three registers 607,608,610, and an address pointer 609. The configuration of this exemplary embodiment of FIG. 6 is identical to that of FIG. 3 except that the former has controller 606 as a part of the control means for the replacement of the content of the register 608.

One program for detecting the maximum data element with the exemplary system of FIG. 6 is provided in FIG. 11.

The data detecting system of FIG. 6 works in the same way as mentioned in the third exemplary embodiment, except for the step in which data element X, the tentative maximum data element, is replaced responding to the sixth instruction.

If the state of the flag shows that the result Z is negative, meaning that data element Y(AY), stored in register 607 is larger than data element X stored in the register 608, then controller 606 passes data element Y(AY) through bus line 603 to register 608, resulting in the replacement of tentative maximum data element X by last-fetched data element Y(AY).

On the other hand, if the result Z turns out to be zero or positive, meaning that data element Y(AY) stored in register 607, is equal to or smaller than data element X stored in register 608, controller 606 is not activated. Since no data replacement occurs, the contents of register 608 remains unchanged. The control step described above is carried out on a "hardware" basis by controller 606 according to a predetermined rule.

Therefore, this operation is executed without time-consuming, conditional-branch commands that retard the operation of a conventional data detecting system.

Figure 7:
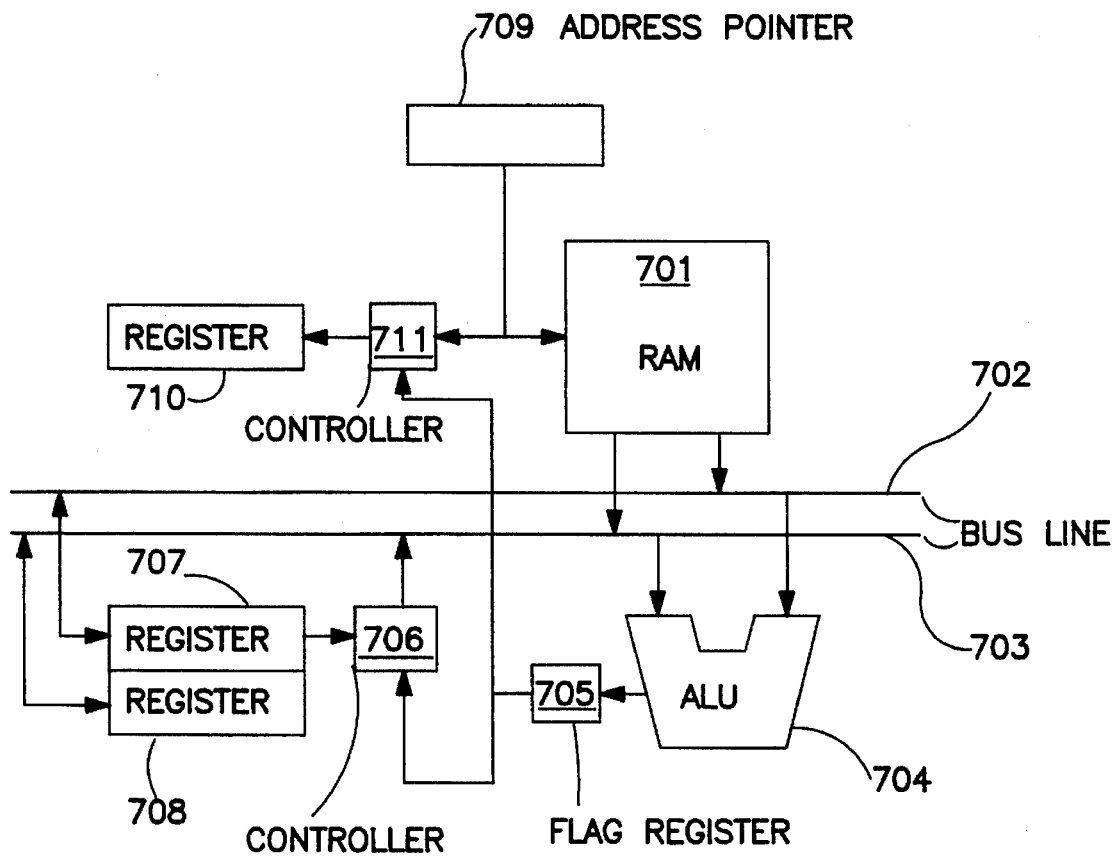
FIG. 7 is a block diagram of a seventh exemplary embodiment of a data detecting system of the present invention.
Figure 8:
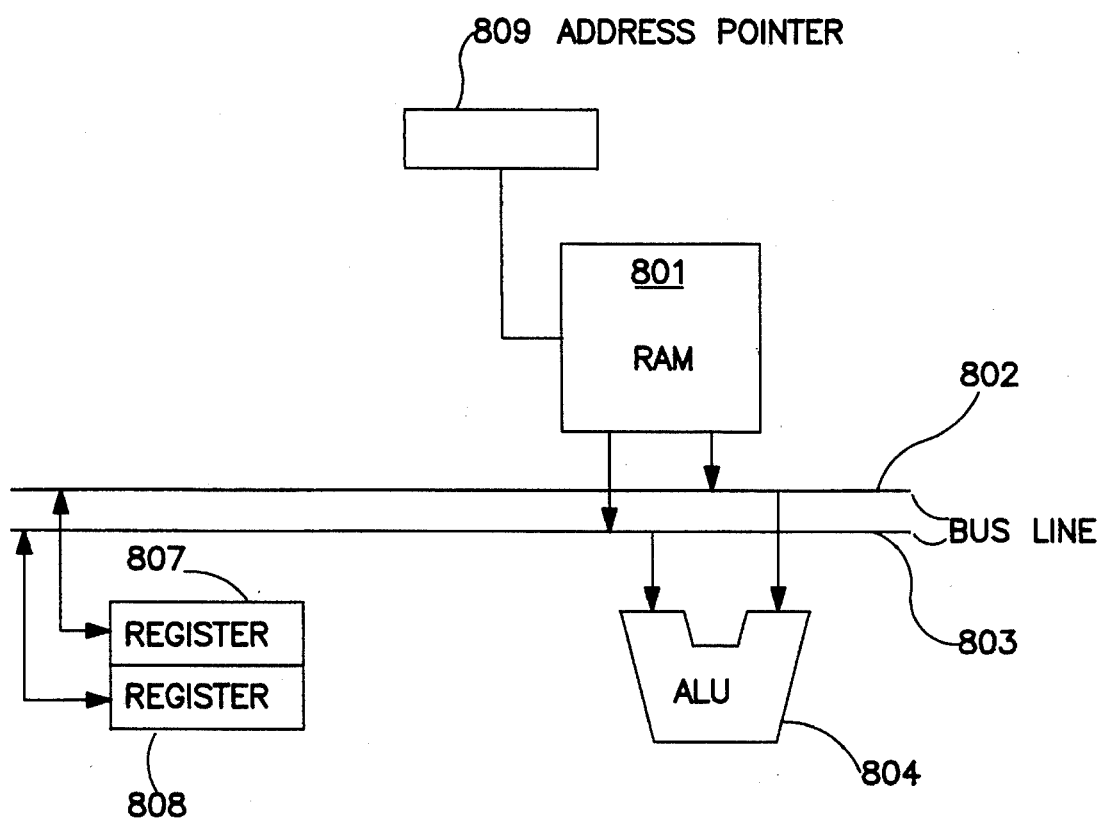
FIG. 8 is a block diagram of a conventional data detecting system.

FIG. 7 is a block diagram of a sixth exemplary embodiment of the present invention. This data detecting system has an array of RAM 701, two bus lines 702,703, an ALU 704, a flag register 705, two controllers 706,711, both of which are controlled by the state of flag register 705, three registers 707,708,710, and an address pointer 709. The configuration of the exemplary embodiment of FIG. 7 is identical to that of FIG. 3 except that the former has two controllers 706,711 as a part of the control means for the replacement of the contents of registers 708,710.

One exemplary program for detecting a maximum data element using the system of FIG. 7 is disclosed in FIG. 11.

The data detecting system of FIG. 7 operates in the same way as described in the third exemplary embodiment except for the step in which data element X, the tentative maximum data element, and data element V, the address of the tentative maximum data element, are replaced in response to the sixth and seventh instructions.

If the state of the flag shows that the result Z is negative, meaning that the data element Y(AY), stored in register 707, is larger than data element X, stored in register 708, controller 706 allows the data element Y(AY) to be transferred to register 708, thus resulting in the replacement of tentative maximum data element X by last-fetched data element Y(AY). In addition, controller 711 allows the address of the last-fetched data element AY to be put into register 710 in order to replace the tentative address V.

On the other hand, if result Z is zero or positive, meaning that data element Y(AY) stored in register 707 is equal to or less than data element X stored in register 708, then controllers 706,711 are not activated. Since no data replacement occurs, the contents of registers 708,710 remain unchanged. The control steps described above are carried out on a "hardware" basis by controllers 706,711 according to a predetermined rule.

Therefore, this operation is free from time-consuming, conditional-branch commands that retard the operation of a conventional data detecting system.

Figure 13:
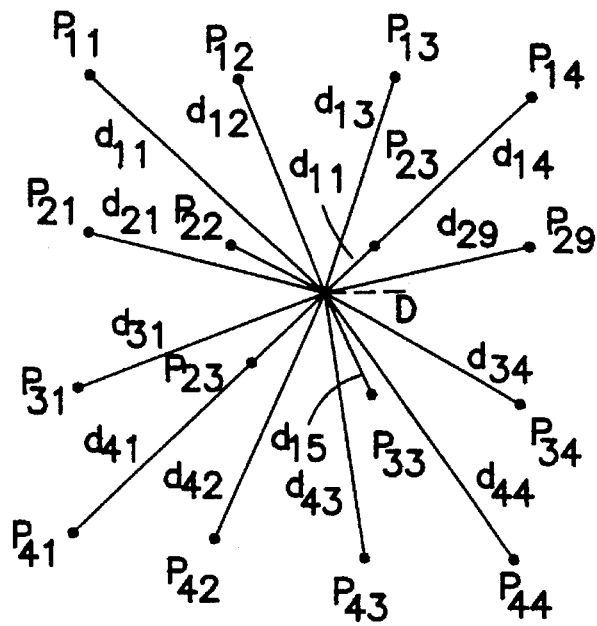
FIG. 13 shows pattern matching on a 2-dimension plane according to an exemplary embodiment of the present invention.

An exemplary embodiment of the present invention can be applied to pattern matching. FIG. 13 shows pattern matching on a 2-dimension plane. In FIG. 13, D shows input data, $P_{11} \sim P_{14}$, $P_{21} \sim P_{24}$, $P_{31} \sim P_{34}$ and $P_{41} \sim P_{44}$ shows a plurality of standard patterns, and $d_{11} \sim d_{14}$, $d_{21} \sim d_{24}$, $d_{31} \sim d_{34}$ and $d_{41} \sim d_{44}$ shows distance from the input data D to each of the standard patterns $P_{11} \sim P_{44}$. When pattern matching is executed, distance $d_{ij}$ is calculated from coordinates (X,Y) of the input data D and coordinates $(X_{ij}, Y_{ij})$ of each of standard patterns $P_{ij}$ as in accordance with expression (1).

$$d_{ij} = \sqrt{(X - X_{ij})^2 + (Y - Y_{ij})^2} \quad (1)$$

As to all standard patterns $P_{ij}$, this calculation is executed successively, and then the minimum distance $d_{ij}$ is detected. Because this invention detects not only the minimum data but also detects the address (ij) of the minimum data, the standard pattern $P_{ij}$ which is the nearest to the input data D can be characterized.

Figure 14:
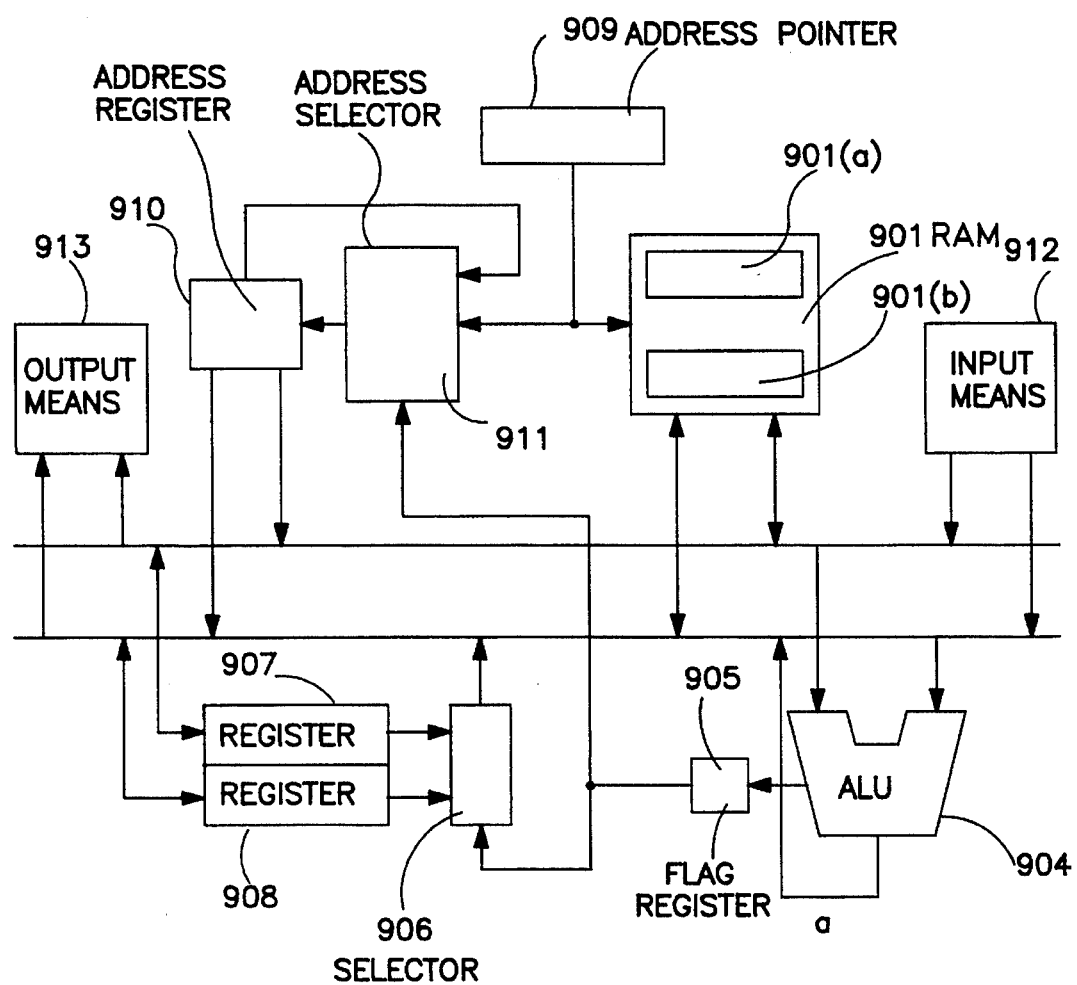
FIG. 14 is a block diagram of an exemplary embodiment of the present invention which can be applied to pattern matching.

FIG. 14 is a block diagram of an exemplary embodiment of the present invention which can be applied to pattern matching.

The exemplary embodiment of the present invention shown in FIG. 14 is similar to the exemplary embodiment of the present invention shown in FIG. 3, however, there are several differences. The differences include a domain 901(a) and a domain 901(b) in RAM 901, an input means 912, an output means 913, and a line (a) from ALU 904 to bus 903. The domain 901(a) includes a plurality of coordinates ($X_{ij}$, $Y_{ij}$) of standard patterns $P_{ij}$, and the domain 901(b) includes distances $d_{ij}$.

The input means 912 transfer input data to the bus 902,903, and the output means 913 transfer output data from the bus 902,903.

The line (a) transfers calculation data calculated from ALU 904 to the bus 903.

The other items shown in FIG. 14 (a flag register 905, a selector 906, two register 907,908, and address pointer 909, a register 910) are similar to the corresponding items shown in FIG. 3.

Pattern matching is now explained.

The coordinate data (X,Y) of the input data D is transferred to ALU 904 through the input means 912, and the coordinate ($X_{ij}$, $Y_{ij}$) of the first pattern data (for example, $P_{11}$) of a plurality of standard pattern elements which is stored in advance in domain 901(a) of RAM 901 is transferred to ALU 904. ALU 904 calculate the expression (1) to obtain a distance data d11, and the distance data $d_{11}$ is stored in domain 901(b) of RAM 901. As before, all distances $d_{ij}$ of all pattern datas $P_{ij}$ is calculated, and is stored in domain 901(b) of RAM 901.

Then the minimum data and the address (ij) of the minimum data of distances $d_{ij}$ which is stored in 901(b) is detected. An operation to detect the aforementioned data and address is the same as the operation to detect the minimum data and the address shown in FIG. 3. Thus, an explanation of the operation is omitted. The standard pattern which is the nearest to input data D is detected based on the address, and the pattern data is transferred to output means 913. As before, the invention can be applied to digital signal processing apparatus (e.g. a voice recognition, a portrait recognition, codec, car telephone, portable telephone, etc.).

Although the present invention has been described in considerable detail with reference to certain preferred versions thereof, other versions are possible. For example, pattern matching can be executed by detecting a maximum data of correlations (input data D and standard pattern $P_{ij}$) in a similar manner as the detection of a minimum data of distances $d_{ij}$.

The exemplary embodiments of the present invention shown in FIGS. 2, 5, 6, and 7 can also be applied to digital signal processing apparatus.

This invention may be embodied or practiced in still other ways without departing from the spirit or essential character thereof. The preferred embodiments described herein are therefore illustrative and not restrictive, the scope of the invention being indicated by the appended claims. All variations which come within the meaning of the claims are intended to be embraced therein.

We claim:

1. A pattern recognition system including means for detecting one of a maximum data signal or a minimum data signal from a plurality of data signals, wherein said plurality of data signals are ordinarily arranged from a first data signal to an nth data signal, said system comprising:

first memory means wherein a plurality of standard pattern data signals are stored in advance;

input means for acquiring input pattern data signals;

calculating means for successively generating a plurality of calculation signals representing a plurality of differences or correlations between each one of said input pattern data signals and one of said plurality of standard pattern data signals;

second memory means for receiving and storing said plurality of calculation signals, wherein said plurality of calculation signals are ordinarily arranged from a first calculation signal to a nth calculation signal;

reading means for reading and transmitting each of said calculation signals of said plurality of calculation signals in succession;

first store means coupled to said reading means wherein a calculation signal which is initially calculated is stored;

second store means coupled to said reading means wherein one of each of a second calculation signal of each of said plurality of calculation signals through the nth calculation signal of said plurality of calculation signals is successively stored;

third store means wherein an address signal of the calculation signal stored in said first store means is stored;

means for obtaining and transmitting the address signal of said first calculation signal of said plurality of calculation signals to said third store means;

comparison means for comparing said calculation signal stored in said first store means and said calculation signal stored in said second store means and for generating and transmitting a comparison signal indicative of said comparison;

a first selector for receiving said comparison signal from said comparison means and for selectively replacing the calculation signal stored in said first store means with the calculation signal stored in said second store means;

a second selector for receiving said comparison signal from said comparison means and for selectively replacing the address signal stored in said third store means with the address signal of the calculation signal contained within said second store means.

2. The system of claim 1 wherein said first control means and said second control means include a program, wherein said program includes a conditional-branch command.

3. The system of claim 1 wherein (a) said first selector includes a first controller connected between said first store means and said second store means;

(b) said first controller selectively transfers said data value stored in said second store means to said first store means;

(c) said second selector includes a second controller connected to said third store means;

(d) said second controller selectively replaces said address stored in said third store means, responsive to said comparison means.

4. The system of claim 1 wherein:

(a) said first selector includes a controller connected between said first store means and said second store means;

(b) said controller selectively transfers said data value stored in said second store means to said first store means, responsive to said result provided by said comparison means;

(c) said second selector is connected to said third store means and said data reading means;

(d) said second selector selects one of the contents of said third store means and an address of a last-fetched data element as contents of the third store means, responsive to said result provided by said comparison means.

5. The system of claim 1 wherein:

(a) said first selector is connected to said first store means and second store means;

(b) said first selector stores one of said data value stored in said first store means and said data value stored in said second store means for storage in said first store means responsive to said result of said comparison;

(c) said second selector includes a controller connected between said third store means and said data reading means;

(d) said controller selectively replaces said address stored in said third store means responsive to said comparison means.

6. The system of claim 1 wherein:

(a) said first selector is connected to said first store means and said second store means;

(b) said first selector stores one of said data value stored in said first store means and said data value stored in said second store means in said first store means, responsive to said result provided by said comparison means;

(C) said second selector is connected to said third store means and said data reading means;

(d) said second selector stores one of said address stored in said third store means and the address of a last-fetched data element in the third store means responsive to said comparison means.

7. The pattern recognition system of claim 1, wherein the address signal stored in the third store means is used to retrieve one of the plurality of standard pattern data signals from the first memory means as a recognized pattern.

* * * * *